(12) United States Patent
Shen et al.

(10) Patent No.: US 12,474,481 B2
(45) Date of Patent: Nov. 18, 2025

(54) METHOD, DEVICE AND SYSTEM OF MULTI-CARRIER CONSTANT ENVELOPE GNSS WAVEFORMS COMPATIBLE WITH EXISTING USER EQUIPMENT

(71) Applicant: Intelligent Fusion Technology, Inc., Germantown, MD (US)

(72) Inventors: Dan Shen, Germantown, MD (US); Genshe Chen, Germantown, MD (US); Tien Nguyen, Germantown, MD (US); Khanh Pham, Kirtland AFB, NM (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 428 days.

(21) Appl. No.: 18/072,866

(22) Filed: Dec. 1, 2022

(65) Prior Publication Data
US 2024/0219579 A1  Jul. 4, 2024

(51) Int. Cl.
*G01S 19/29* (2010.01)
*G01S 19/32* (2010.01)

(52) U.S. Cl.
CPC .............. *G01S 19/29* (2013.01); *G01S 19/32* (2013.01)

(58) Field of Classification Search
CPC ................................. G01S 19/29; G01S 19/32
See application file for complete search history.

(56) References Cited

PUBLICATIONS

Yan, T., Tang, Z., Wei, J., Qu, B. and Zhou, Z., 2015. A quasi-constant envelope multiplexing technique for GNSS signals. The Journal of Navigation, 68(4), pp. 791-808.*
Yao, Z., Guo, F., Ma, J. and Lu, M., 2017. Orthogonality-based generalized multicarrier constant envelope multiplexing for DSSS signals. IEEE Transactions on Aerospace and Electronic Systems, 53(4), pp. 1685-1698.*
Yao, Z., Lu, M., Yao, Z. and Lu, M., 2021. Constant Envelope Multiplexing Techniques for Spread-Spectrum Signals. Next-Generation GNSS Signal Design: Theories, Principles and Technologies, pp. 285-300.*
Chen, X., Lu, X., Wang, X., Ke, J. and Guo, X., 2021. Constant envelope multiplexing of multi-carrier dsss signals considering sub-carrier frequency constraint. Electronics, 10(2), p. 211.*

\* cited by examiner

*Primary Examiner* — Zhitong Chen
(74) *Attorney, Agent, or Firm* — ANOVA LAW GROUP, PLLC

(57) ABSTRACT

A global navigation satellite system (GNSS) is disclosed comprising a transmitter. The transmitter is configured to: receive a plurality of frequencies; determine a minimum frequency from the plurality of frequencies; determine a maximum frequency from the plurality of frequencies; determine a carrier from the minimum frequency and the maximum frequency; determine a set of subcarriers from the carrier and the plurality of frequencies; identify optimal radius of desired phase points to select optimal subcarriers from the set of subcarriers; determine inter-modulation terms with a minimal energy based on the optimal subcarriers; and generate multi-carrier constant envelope waveforms based on the inter-modulation terms.

18 Claims, 18 Drawing Sheets

US 12,474,481 B2

METHOD, DEVICE AND SYSTEM OF MULTI-CARRIER CONSTANT ENVELOPE GNSS WAVEFORMS COMPATIBLE WITH EXISTING USER EQUIPMENT

GOVERNMENT RIGHTS

This invention was made with Government support under Contract No. FA9453-21-C-0539, awarded by the United States Air Force. The U.S. Government has certain rights in this invention.

FIELD

The disclosure generally relates to the field of global navigation satellite system (GNSS), more particularly, relates to method, device and system of multi-carrier constant envelope GNSS waveforms compatible with existing user equipment.

BACKGROUND

Navigation signals with a constant envelope (CE) have an inherent transmitted power advantage for a global navigation satellite system (GNSS) transmitter due to the fixed amplitude gain and fixed phase offset even after a nonlinear high power amplifier (HPA). The positioning, navigation and timing (PNT) performance of the received signals is hardly affected by the nonlinear HPAs.

Wideband multi-carrier modulation is also beneficial for GNSS in both saving the number of HPAs, but also enhancing the coherency of different GNSS bands. Traditional global positioning system (GPS) space segments are comprised of separate transmitters for different bands such as L1, L2, and L5. Since the signal of each band goes through a different radio frequency (RF) chain, the coherency among different channels is relatively lower than the wideband multi-carrier modulation, where L1, L2, and L5 are three sub-bands centered at 1575.42 MHz, 1227.60 MHz, and 1176 MHz, respectively. These three sub-channels share a same RF chain. The increased coherency will improve the PNT performance for the multi-band GPS receivers. The benefits of wide-band multi-carrier modulation is also applicable to other types of GNSS, e.g., BeiDou/BDS (China), Galileo (Europe), GLONASS (Russia), IRNSS/NavIC (India), and QZSS (Japan).

Although some multi-carrier constant envelope modulation, for example, CE multi-carrier modulation based on discrete cosine transform (DCT) and continuous phase modulation (CPM), orthogonal frequency division multiplexing (OFDM) combined with phase modulation (PM) for creating CE multi-carrier waveforms, and OFDM for multi-carrier and PM for CE for radar applications, have been disclosed, all these techniques are not friendly with the existing GNSS systems because these proposed multi-carrier CE waveforms require the demodulators in user equipment to be redesigned.

Therefore, there is a need for method, device and system of multi-carrier constant envelope GNSS waveforms compatible with existing user equipment.

SUMMARY

One aspect of the present disclosure provides a global navigation satellite system (GNSS). The GNSS includes at least one transmitter. The at least one transmitter is configured to: receive a plurality of frequencies; determine a carrier and a set of subcarriers from the plurality of frequencies; identify optimal radius of desired phase points to select optimal subcarriers from the set of subcarriers; determine inter-modulation terms with a minimal energy based on the optimal subcarriers; and generate multi-carrier constant envelope waveforms based on the inter-modulation terms.

Another aspect of the present disclosure provides a method implemented in a global navigation satellite system (GNSS) including a transmitter. The method includes: receiving a plurality of frequencies; determining a carrier and a set of subcarriers from the plurality of frequencies; identifying optimal radius of desired phase points to select optimal subcarriers from the set of subcarriers; determining inter-modulation terms with a minimal energy based on the optimal subcarriers; and generating multi-carrier constant envelope waveforms based on the inter-modulation terms.

Another aspect of the present disclosure provides a non-transitory computer readable medium having instructions stored thereon that, when executed by a computer device, cause the computer device to perform a method implemented in a global navigation satellite system (GNSS) including a transmitter. The method includes: receiving a plurality of frequencies; determining a carrier and a set of subcarriers from the plurality of frequencies; identifying optimal radius of desired phase points to select optimal subcarriers from the set of subcarriers; determining inter-modulation terms with a minimal energy based on the optimal subcarriers; and generating multi-carrier constant envelope waveforms based on the inter-modulation terms.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
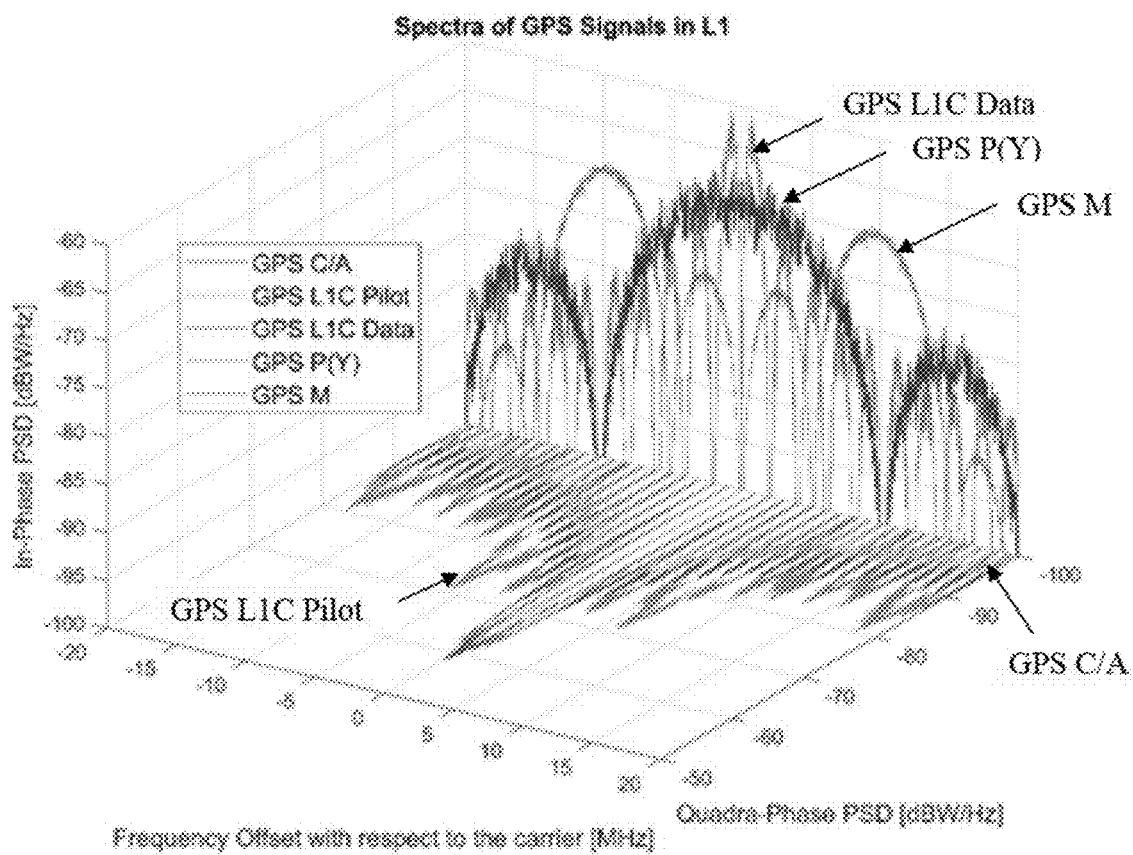
FIG. 1 illustrates an exemplary spectral of GPS signals in L1 according to various embodiments of the present disclosure.

Reference will now be made in detail to exemplary embodiments of the disclosure, which are illustrated in the accompanying drawings. Wherever possible, the same reference numbers will be used throughout the drawings to refer to the same or similar parts.

Constant envelope (CE) waveforms are desired for global navigation satellite system (GNSS) due to the fixed amplitude gain and fixed phase offset even after a nonlinear amplifier. Wideband multi-carrier modulation is also beneficial for GNSS in both saving the number of High Power Amplifiers (HPAs) and enhancing the coherency of different GNSS bands. In this disclosure, multi-carrier CE waveforms (MCEW) compatible with existing GNSS user equipment are disclosed. The GNSS channels are first combined using subcarriers. Then additional inter-modulation terms are added to create the CE signals. The disclosed framework herein is generic to convert separate GNSS waveforms to a wideband multi-carrier CE modulation which can be demodulated using existing user equipment. The performance of MCEW is evaluated on GPS L2 and L5 channels. In addition to the navigation PRN chip error rate (CER), the correlation loss (CL) and S-curve bias (SCB) are computed as well. The results demonstrate the efficiency and backward compatibility of the proposed MCEW.

More specifically, in this disclosure, a generic approach using MCEW concept is disclosed that is compatible with existing GNSS user equipment. The GNSS channels are first combined using subcarriers. Then additional inter-modulation terms are added to create the CE signals. The framework disclosed herein is generic to convert separate GNSS waveforms to a wideband multi-carrier CE modulation which can be demodulated using existing GNSS user equipment. The system, method and device disclosed herein need the upgrades on the space segments only. It can save the huge costs in re-designing and re-engineering the user equipment.

To demonstrate the MCEW concept, the performance of MCEW is evaluated, for example, on GPS L2 and L5 channels. In addition to the Navigation PRN chip error rate (CER), the correlation loss (CL) and S-curve bias (SCB) are computed as well. The results demonstrate the efficiency and backward compatibility of the proposed MCEW.

Herein related background is introduced on current GPS waveforms, constant envelope multiplexing, and metrics for GNSS signal quality assessment. For GPS waveforms, GPS data contains various configuration parameters, clock parameters, and parameters related to the location of a satellite vehicle (SV) in space. All of these parameters can be classified into three broad categories: ephemeris parameters; almanac parameters; and parameters that are neither ephemeris nor almanac, which include configuration parameters, clock parameters, ionosphere parameters, Universal Time Coordinated (UTC) parameters, and navigation message correction tables (NMCT) parameters.

GPS satellites transmit signals on three frequencies: L1 (1575.42 MHz), L2 (1227.60 MHz), and L5 (1176.45 MHz). All three signals are generated from a base frequency of 10.23 MHz. The signal frequency of L1 is 154×10.23 MHz=1575.42 MHz, the signal frequency of L2 is 120× 10.23 MHz=1227.60 MHz, and the frequency of L5 is 115×10.23 MHz=1176.45 MHz.

Figure 2:
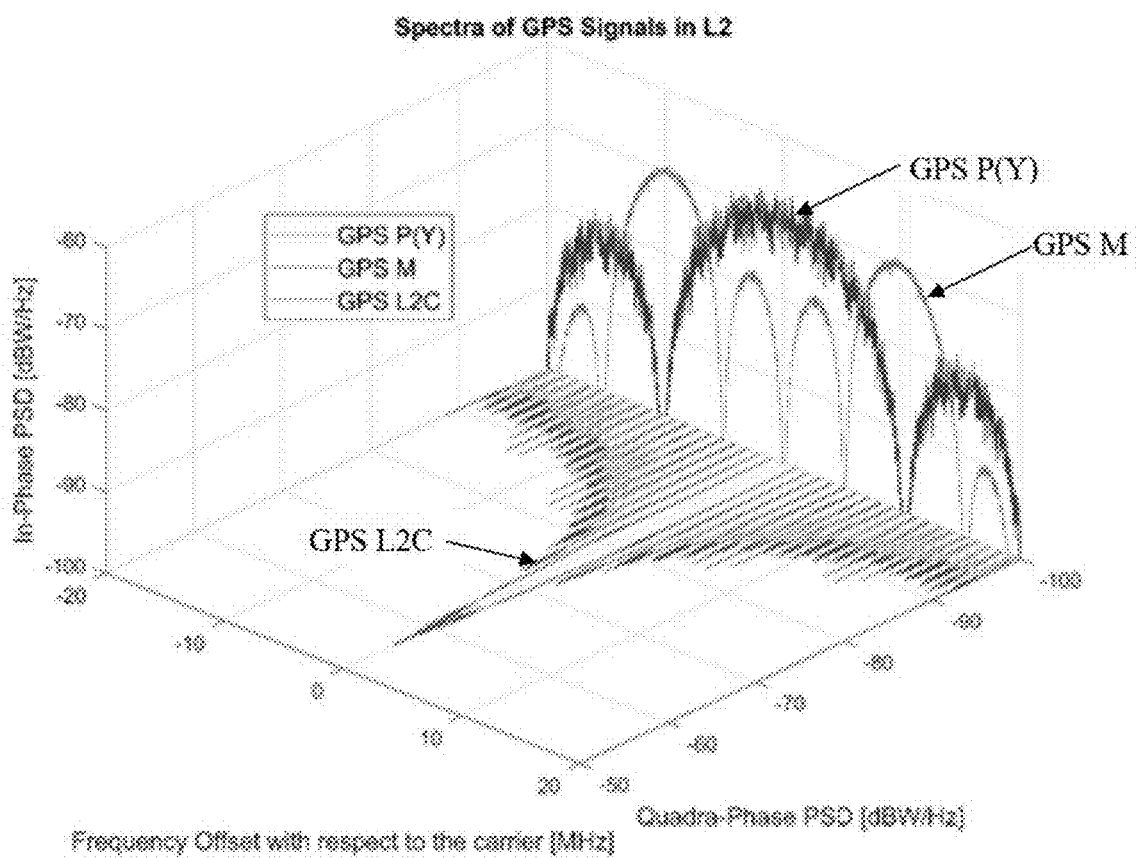
FIG. 2 illustrates an exemplary spectral of GPS signals in L2 according to various embodiments of the present disclosure.
Figure 3:
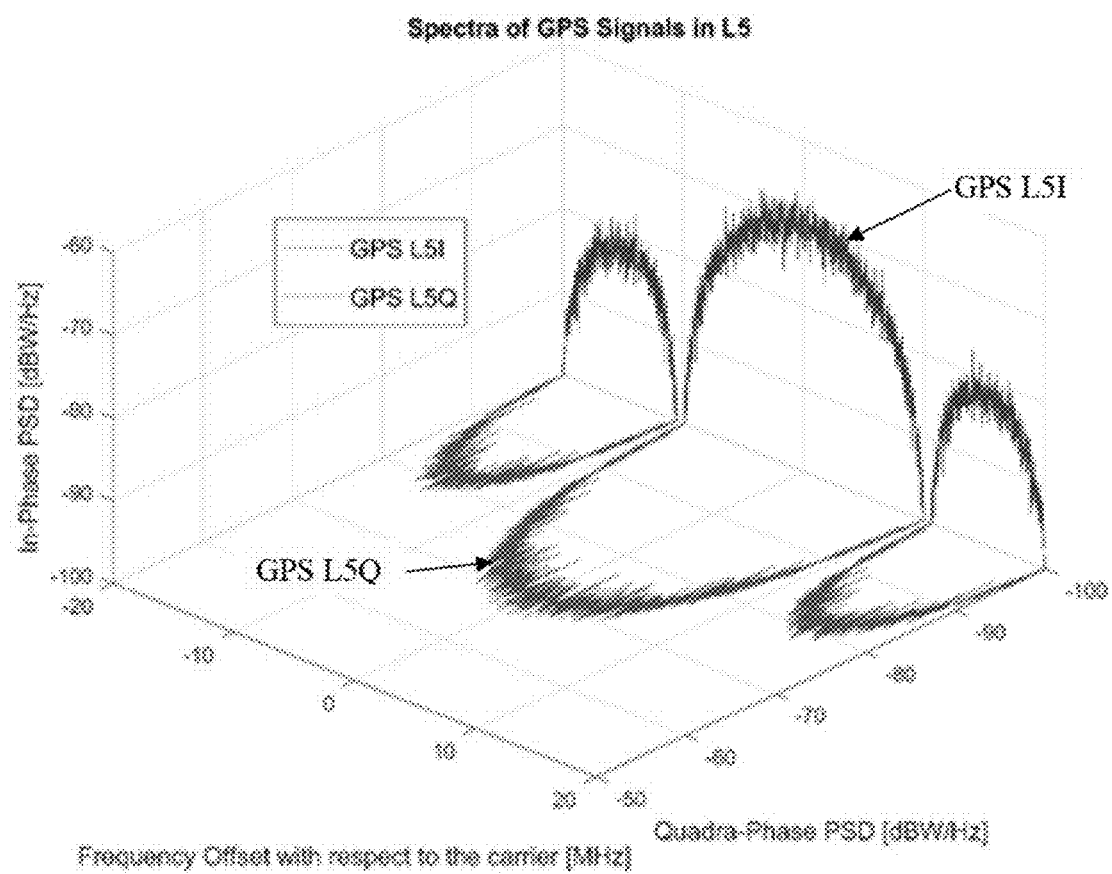
FIG. 3 illustrates an exemplary spectral of GPS signals in L5 according to various embodiments of the present disclosure.

Each channel has several bitstreams (such as C/A codes, P(Y) codes, etc.). The main components of modern GPS waveforms are illustrated in FIG. 1, FIG. 2, and FIG. 3 for L1, L2, and L5, respectively. Y-code is not available for public use. Because Y-code is an encrypted version of P-code, P-code and Y-code are used together as P(Y)-code. In this disclosure, the P codes are used to represent the P(Y) code. Since M codes are for military purposes only, the M codes will be skipped from the numerical simulation as well as the following parts of this disclosure.

For constant envelope multiplexing, CE signals have an inherent transmitted power advantage for a transmitter due to the fixed amplitude gain and fixed phase offset even after a nonlinear amplifier. Therefore, when using an HPA, the input signal should be as close as possible to a constant envelope signal.

To ensure the CE property, an intuitive idea is to add additional inter-modulation component $I_{IM}(t)$. For example, to multiplex three bitstreams, $s_1$, $s_2$, and $s_3$, it can set $$s(t) = s_I(t)\cos 2\pi f_c t - s_Q(t)\sin 2\pi f_c t \quad (1)$$

$$s_I(t) = \sqrt{2P_I}s_1(t)\cos m \sqrt{2P_Q}s_2(t)\sin m \quad (2)$$

$$s_Q(t) = \sqrt{2P_Q}s_3(t)\cos m \sqrt{2P_I}s_1(t)s_2(t)s_3(t)\sin m \quad (3)$$

The last term in $s_Q(t)$ is the inter-modulation (IM) component. sin m and cos m are the design factors, which are used to control the power ratio of I and Q components, denoted by $S_I$ and $S_Q$. To verify the constant envelope, it can rewrite s(t) as $$\begin{aligned}s(t) &= s_I(t)\cos 2\pi f_c t - s_Q(t)\sin 2\pi f_c t \quad (4)\\ &= \text{Re}\{(s_I(t) + js_Q(t))(\cos 2\pi f_c t + j\sin 2\pi f_c t)\}\end{aligned}$$

Where the operator Re(•) extracts the real part from a complex input. Therefore, it is only needed to prove that $s_I(t)+js_Q(t)$ has a constant magnitude. There have $$s_I^2(t) = 2P_I s_1^2 \cos^2 m + 2P_Q s_2^2 \sin^2 m - 2\sqrt{P_I P_Q} s_1 s_2 \sin m \cos m \quad (5)$$

$$s_Q^2(t) = 2P_Q s_3^2 \cos^2 m + 2P_I s_1^2 s_2^2 s_3^2 \sin^2 m + 2\sqrt{P_I P_Q} s_1 s_2 s_3^2 \sin m \cos m \quad (6)$$

Since $s_i^2 = 1$, the constant envelope is approved as $$s_I^2(t) + s_Q^2(t) = 2P_I + 2P_Q \quad (7)$$

In the following description, the present disclosure will present a framework of systemically adding IM components to make CE waveforms.

For metrics for GNSS signal quality assessment, given two signals, $s_r$ and $s_{Ref}$, the cross-correlation function (CCF) is defined as $$CCF(\varepsilon) = \frac{\int_0^{T_p} s_r(t) \cdot s_{Ref}^*(t - \varepsilon) dt}{\sqrt{\left(\int_0^{T_p} |s_r(t)|^2 dt\right)\left(\int_0^{T_p} |s_{Ref}(t)|^2 dt\right)}} \quad (8)$$

Where $\varepsilon$ is the time shift and $T_p$ is the integration time. For GNSS, the $T_p$ is usually set to primary code-period of the signals. CCF actually computes the normalized cross-correlation.

Based on the CCF, it can define the CL and SCB. These two metrics will be used to assess the disclosed MCEW performance later.

The basis of CL is the correlation power $P_{CCF}$, which is defined as $$P_{CCF}[dB] = \max_{over\ all\ \varepsilon} (20 \cdot \log_{10} |CCF(\varepsilon)|) \quad (9)$$

The CL is then defined as $$CL[dB] = P_{CCF}_{Ideal\ S_r}[dB] - P_{CCF}_{Real\ S_r}[dB] \quad (10)$$

In general, CL can be used to evaluate the distortion. By setting different signals to $s_r$ and $s_{Ref}$, the distortion from various factors can be computed. For example, for evaluating the overall distortion of transmitter, channel, and receiver, it can set $s_{Ref}$ as the GPS codes to be transmitted, the real $s_r$ as the received GPS codes, and the ideal $s_r$ as the same value of $s_{Ref}$. In another case, if wanting to know the distortion due to filters used in the receiver, it can set $s_{Ref}$ as the GPS codes to be transmitted, the real $s_r$ as the received GPS codes with real filters, and the ideal $s_r$ as the received GPS codes with ideal sharp-cutoff filters (or brick-wall filters). In this disclosure, the former is referred to as overall CL and the latter as the filter CL. In the control interface documents (ICDs) of GPS, it can find the allowable filter CL is 0.3 dB for C/A & L2C and 0.6 dB for L5 and L2P.

S-curve is defined as $$SCurve(\varepsilon,\delta) = |CCF(\varepsilon - 0.5\delta)|^2 - |CCF(\varepsilon + 0.5\delta)|^2 \quad (11)$$

Where $\delta$ is the early-late spacing of the code-discriminator. The lock-point $\varepsilon_{bias}(\delta)$ is defined by $SCurve(\varepsilon_{bias}(\delta), \delta) = 0$. In case of more than one zero-crossing, the delay closest to the delay of maximum correlation power has to be selected. Then the SCB is $$SCB = \max_{over\ all\ \delta} \varepsilon_{bias}(\delta) - \min_{over\ all\ \delta} \varepsilon_{bias}(\delta) \quad (12)$$

SCB is an index that can be used to describe the timing bias. Specially, SCB is used to describe the deviation between the highest peak and the corresponding symmetric point on the correlation curve. The delay locked loop (DLL) usually locks in the place where the timing is biased.

In this disclosure, a multi-carrier constant envelope waveform (MCEW) for GNSS is disclosed to not only combine adjacent frequencies (for example, GPS L2 and GPS L5) of GNSS, but also ensure its constant envelope.

After selecting GNSS channels to combine, optimal subcarriers are selected to minimize the number of inter-modulation (IM) terms. Then additional IM terms will be calculated to ensure the constant envelope. An exemplary algorithm of combining original frequencies $f_{o1}, f_{o2}, \ldots f_{on}$ is listed as

---

MCEW Algorithm

---

1: Set subcarriers and carrier $$\text{compute } f_{min} = \min\{f_{o1}, f_{o2}, \ldots f_{on}\}$$
$$\text{compute } f_{max} = \max\{f_{o1}, f_{o2}, \ldots f_{on}\}$$
$$\text{set } f_c = (f_{min} + f_{max})/2$$
$$\text{set subcarrier } f_i = f_{oi} - f_c$$

2: Find optimal radius of the desired phase points $$R^* = \arg\min_R \sum_{k=1}^{N} (|\vec{c_k}| - R)^2, \text{ where } c_k \text{ is the constellation points of the Step 1}$$

3: find the CE inter-modulation terms with the minimal energy $$\vec{I_{IM_k}^*} = \frac{R^* - |\vec{c_k}|}{|\vec{c_k}|} \vec{c_k}$$

---

Figure 4:
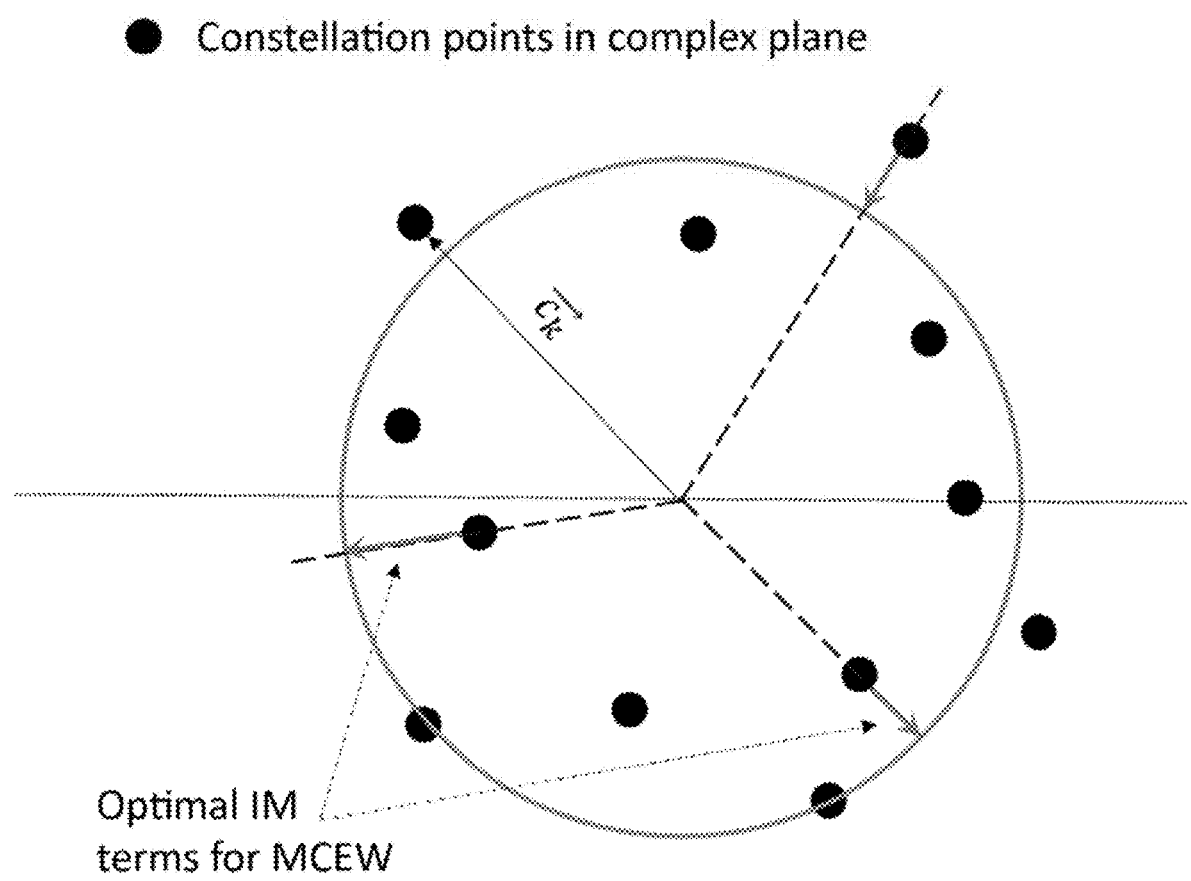
FIG. 4 illustrates a diagram of finding CE inter-modulation terms in an exemplary MCEW algorithm according to various embodiments of the present disclosure.

FIG. 4 illustrates a diagram of finding CE inter-modulation terms in an exemplary MCEW algorithm according to various embodiments of the present disclosure. Specifically, FIG. 4 illustrates the Step 3 above. The inter-modulation terms with minimal energy not only ensure the constant envelope property, but also keep the original phases. The fixed-phase feature enables the possibility of using existing user equipment to demodulate the new MCEM signals.

Figure 5:
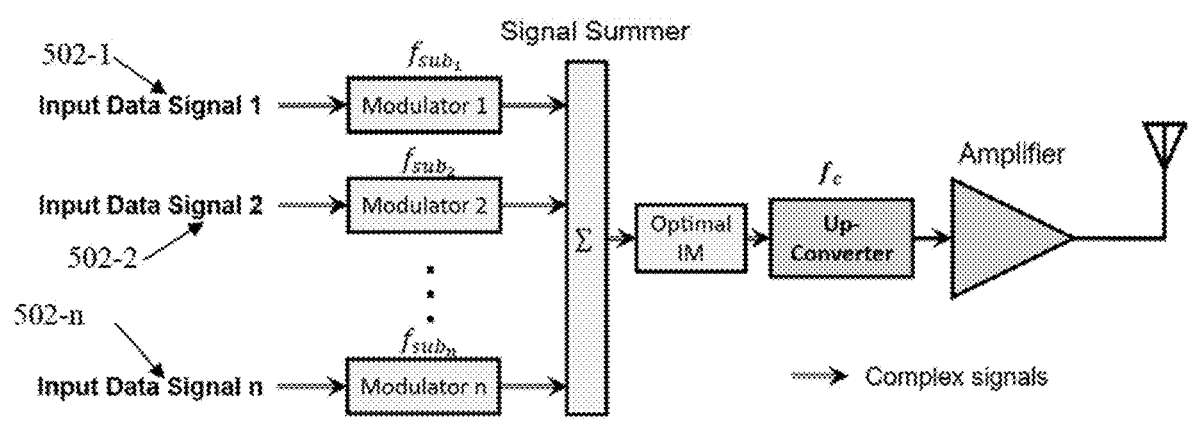
FIG. 5 illustrates a block diagram of an exemplary generic transmitter using MCEW according to various embodiments of the present disclosure.

FIG. 5 illustrates a block diagram of an exemplary generic transmitter 500 using MCEW according to various embodiments of the present disclosure. In the corresponding transmitter structure 500 shown in FIG. 5, the input data 502-1, 502-2, 502-3 ... 502-n is the component of the GNSS. For example, the L5 (including L5I and L5Q), L2 (including P/Y and L2C) and L1 (including L1C, C/A, P/Y, and/or M) are the components of GPS.

In an exemplary use case, the disclosed exemplary MCEW algorithm is applied to GPS L2 and L5 on the transmitter side. These GPS bitstreams are generated by following the GPS ICDs. Table I lists the subcarrier and wideband carrier of the MCEW combing L2 and L5.

TABLE I

SUBCARRIER AND WIDEBAND CARRIER

| Bit-streams | Bandwidth | Original Carrier | Subcarrier | Broad Band Carrier |
|---|---|---|---|---|
| L2 P(Y) | 10.23 Mhz | 120 × 10.23 = 1227.6 MHz | 2.5 × 10.23 = 25.575 MHz | 117.5 × 10.23 = 1202.025 Mhz |
| L2C | 1.023 Mhz | 1227.6 MHz | 25.575 MHz | 10.23 = |
| L5I | 10.23 Mhz | 115 × 10.23 = 1176.45 MHz | −2.5 × 10.23 = −25.575 MHz | 1202.025 Mhz |
| L5Q | 10.23 Mhz | 1176.45 MHz | 10.23 = −25.575 MHz | |

There are two frequencies $f_{o1}=1227.6$ MHz and $f_{o2}=1176.45$ MHz. According to the step 1 of the exemplary MCEW algorithm, it is set that the $$f_c = \frac{f_{o1} + f_{o2}}{2} = 1202.025 \text{ MHz}.$$

Figure 6:
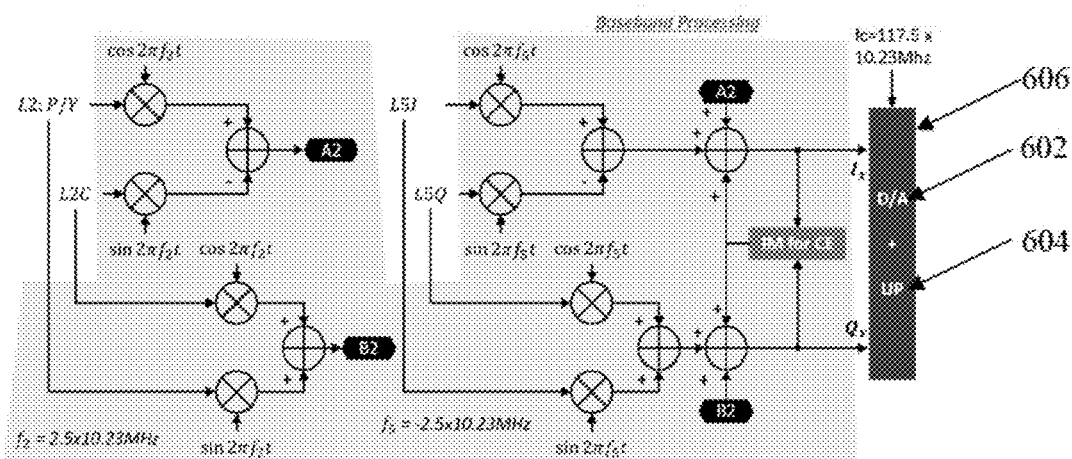
FIG. 6 illustrates an exemplary transmitter structure of combing GPS L2 and L5 using MCEW according to one embodiments of the present disclosure.

Then the subcarrier 1 for L2 is at $f_2=f_{o1}-f_c=25.575$ MHz and subcarrier 2 for L5 is at $f_5=f_{o2}-f_c=-25.575$ MHz. FIG. 6 illustrates an exemplary transmitter structure 600 of combing GPS L2 and L5 using the exemplary MCEW algorithm according to one embodiments of the present disclosure. In the transmitter structure 600 illustrated in FIG. 6, the D/A 602 is a digital-to-analog convert, and the UP 604 is for upconversion. The HPA and antenna are after the purple box 606. Since the baseband processing is conducted in the digital domain, the negative subcarrier of L5, $f_5$, is feasible.

For the GPS use case, a numerical simulation is performed. The transmitter structure 600 shown in FIG. 6 is implemented in MATLAB. Since the real wideband carrier $f_c=1202.025$ MHz is too computational expensive to simulate in computers, without the loss of generality, the wideband is lowered to 102.3 MHz, which is high enough for the two subcarriers at ±2×10.23 MHz. In the numerical simulation, the reduced frequency is labeled as an intermediate frequency (IF). Accordingly, the sampling frequency is set to $f_s=409.2$ MHz.

Figure 7:
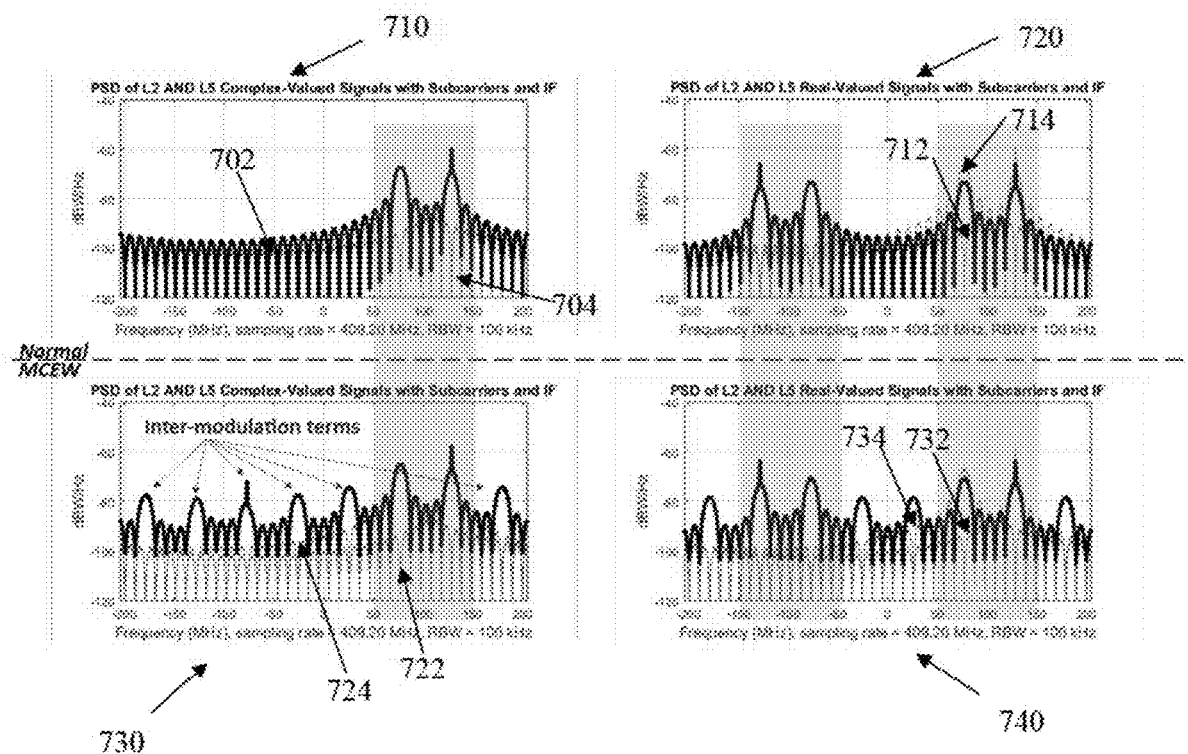
FIG. 7 illustrates graphs of power spectral density (PSD) of signals before and after adding IM terms according to one embodiments of the present disclosure.

For MCEW modulation, FIG. 7 illustrates graphs of power spectral density (PSD) of signals before and after adding IM terms according to one embodiments of the present disclosure. Specifically, FIG. 7 shows the estimated spectrums of the baseband and passband signals with (plots 730 and 740) and without IM terms (plots 710 and 720) for CE. The left power spectral density (PSD) plots 710 and 730 are for complex-valued signals, while the right plots 720 and 740 are PSD of real-valued signals, which are the real part of the complex signals. For the comparison purpose, it is plotted the PSD of the L2 only and L5 only with the color of blue (702, 712, 722 and 732) and brown (704, 714, 724 and 734) respectively. Since the MCEW disclosed herein doesn't change the original phases, the shape of PSD in the band of interest keeps the same.

Figure 8:
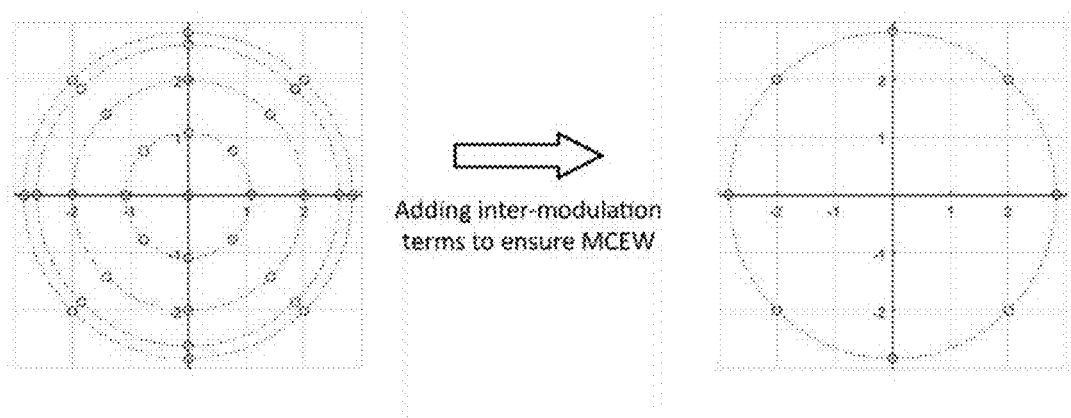
FIG. 8 illustrates graphs of constellation points before and after adding IM terms according to one embodiments of the present disclosure.

FIG. 8 illustrates graphs of constellation points before and after adding IM terms according to one embodiments of the present disclosure. The corresponding constellation points are shown in FIG. 8, where it can be seen that the additional IM terms ensure constant envelope waveforms.

Figure 9:
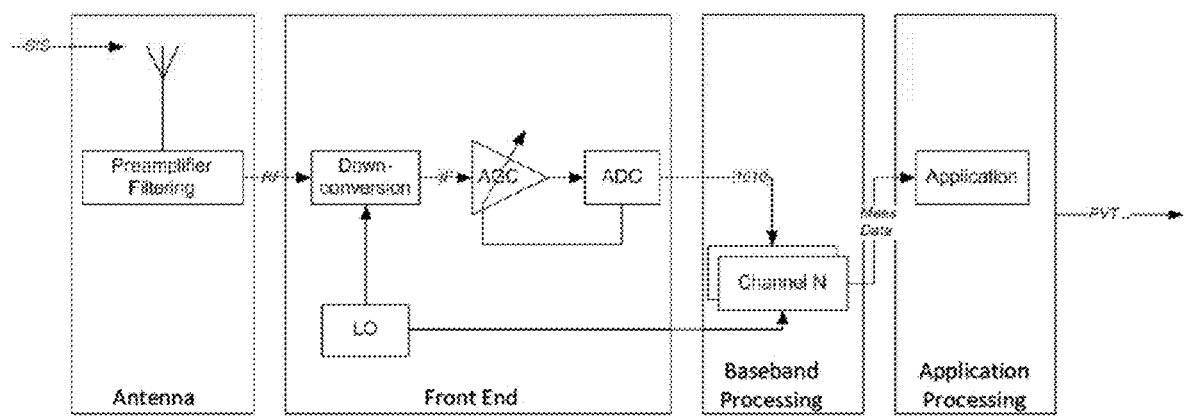
FIG. 9 illustrates an exemplary generic GNSS receiver by GSSC according to one embodiments of the present disclosure.

FIG. 9 illustrates an exemplary generic GNSS receiver 900 by GSSC according to one embodiments of the present disclosure. For demodulation and to evaluate the performance of the MCEW, a receiver is simulated by following the existing generic structure (FIG. 9) specified in the ESA GNSS Science Support Centre (GSSC) Navipedia website.

Given the received signal, $R_x(t)=I_x(t)\cos 2\pi f_c t - Q_x(t)\sin 2\pi f_c t$, the following down-conversion is simulated using $fIF = 5\times10.23$ MHz. Then the local frequency $f_r=f_c-f_{IF}$ is generated. Assuming perfect carrier synchronization, the following can be obtained.

$$2R_x(t)\cos 2\pi f_r t = I_x(t)\cos 2\pi f_{IF} t - \qquad (13)$$

$$Q_x(t)\sin 2\pi f_{IF} t + I_x(t)\cos 2\pi (f_c + f_r)t - Q_x(t)\sin 2\pi (f_c + f_r)t$$

$$-2R_x(t)\sin 2\pi f_c t = I_x(t)\sin 2\pi f_{IF} t + \qquad (14)$$

$$Q_x(t)\cos 2\pi f_{IF} t - I_x(t)\sin 2\pi (f_c + f_r)t - Q_x(t)\cos 2\pi (f_c + f_r)t$$

Figure 10:
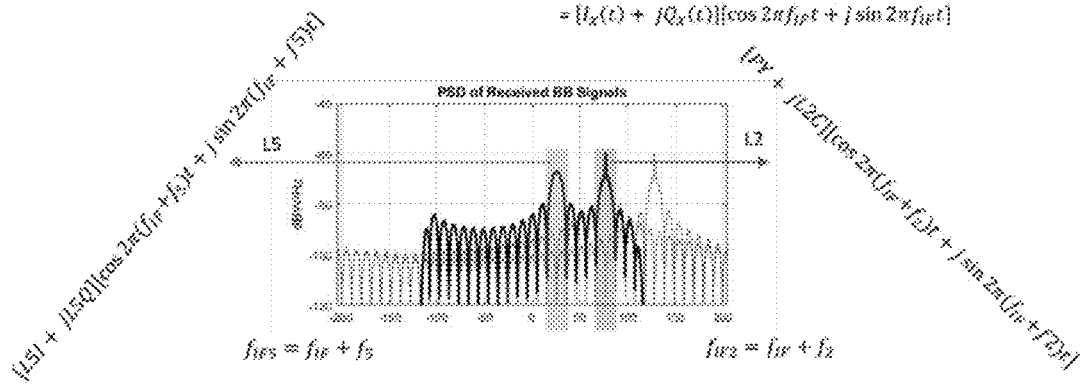
FIG. 10 illustrates a graph of down-conversion results used as inputs to a baseband processing according to one embodiments of the present disclosure.

FIG. 10 illustrates a graph of down-conversion results used as inputs to a baseband processing according to one embodiments of the present disclosure. Each branch has two terms (blue one and red one). The low pass filter (LPF) is used to remove the red terms and get the down-conversion results (as shown in FIG. 10).

Figure 11:
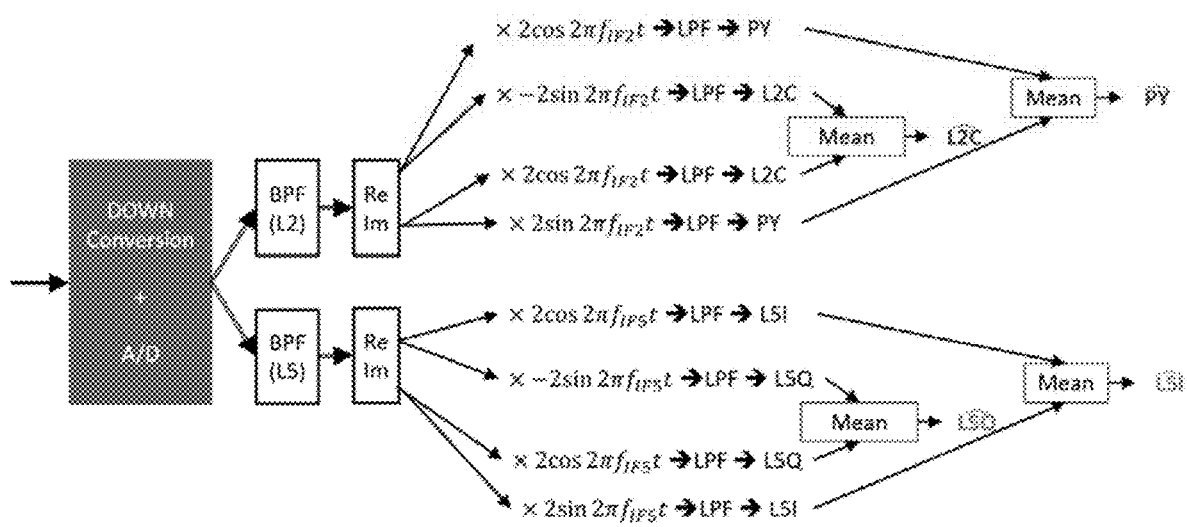
FIG. 11 illustrates a block diagram of a simulated receiver for GPS L2 and L5 according to one embodiments of the present disclosure.

FIG. 11 illustrates a block diagram of a simulated receiver for GPS L2 and L5 according to one embodiments of the present disclosure. In the baseband processing, bandpass filters (BPFs) are desinged for GPS L2 and GPS L5. Then a standard structure is used to demodulate the L2 and L5 signals and get the transmitted bitstreams. The receiver structure is summarized in the FIG. 11.

Figure 12:
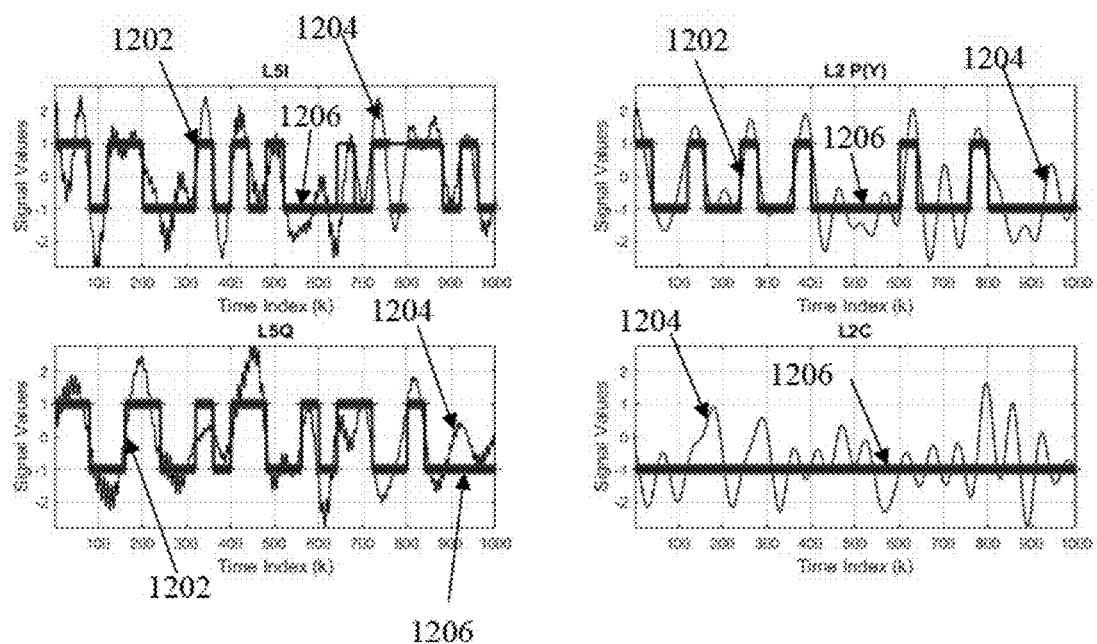
FIG. 12 illustrates block diagrams of a simulated receiver for GPS L2 and L5 according to one embodiments of the present disclosure.

FIG. 12 illustrates block diagrams of a simulated receiver for GPS L2 and L5 according to one embodiments of the present disclosure. An additive white Gaussian noise (AWGN) is simulated by using the MATLAB function rM=awgn(rM, snr, 'measured'), where IM is the real-valued transmitted RF signal. The decoded L5 and L2 bitstreams for SNR=−5 dB are shown in FIG. 12, where blue line 1202 is the ground truth, black line 1204 is the received samples, the red one 1206 is the decoded bits of the simple decision rule: sign(mean(symbol samples)). The CER is calculated for each bitstream (within the duration of 1 ms) and get the results in Table II.

TABLE II

BER OF MCEW

| | L5I CER | L5Q CER | L2C CER | L2P CER |
|---|---|---|---|---|
| SNR = −5 dB | 4.64 × 10^−4 | 4.80 × 10^−4 | 0.00 × 10^−4 | 5.35 × 10^−4 |
| SNR = −10 dB | 1.75 × 10^e−3 | 1.74 × 10^−3 | 0.00 × 10^−4 | 1.70 × 10^−3 |

Figure 13:
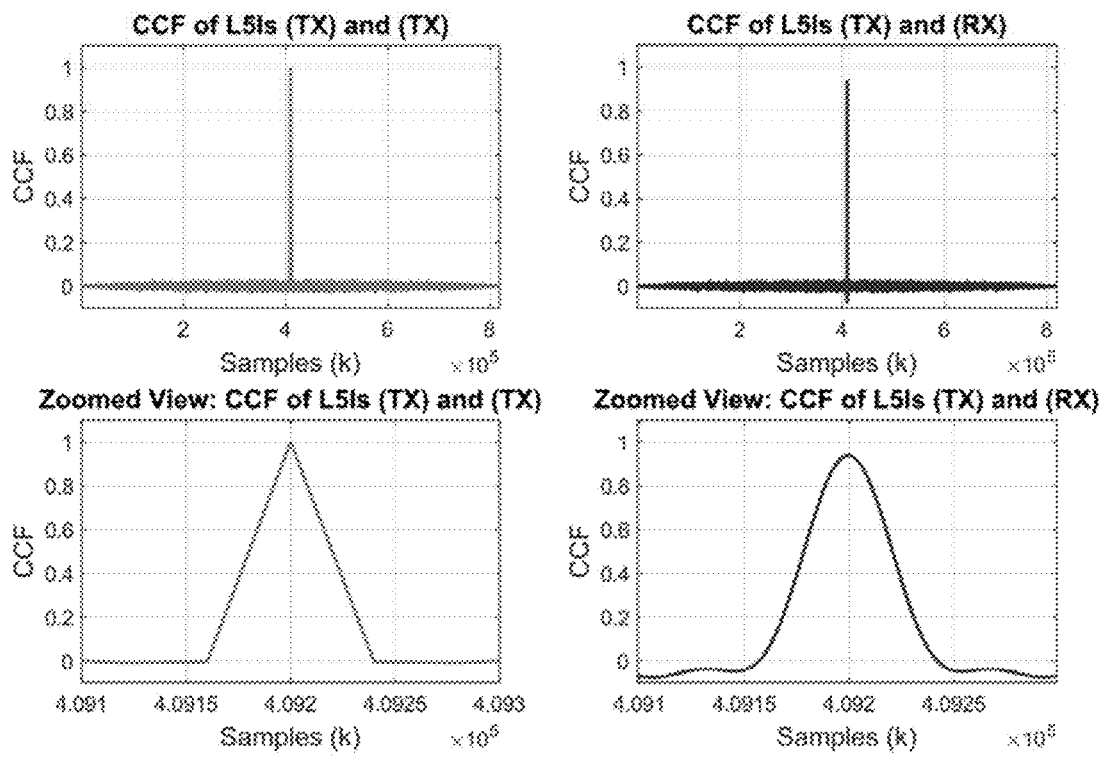
FIG. 13 illustrates a cross-correlation function (CCF) of L5I for an overall performance evaluation according to one embodiments of the present disclosure.

FIG. 13 illustrates a cross-correlation function (CCF) of L5I for an overall performance evaluation according to one embodiments of the present disclosure. To evaluate the overall performance of MCEW, the CL and the CCF results of L5I are calculated and illustrated in FIG. 13. The overall CL for L5I is $20 \log_{10} 1 - 20 \cdot 11\log_{10} 0.9388 = 0.5490$ dB. Similarly, the overall CL for L5Q, L2C, L2P is obtained as 0.5493 dB, 0.0857 dB, and 0.5656 dB, respectively.

Figure 14:
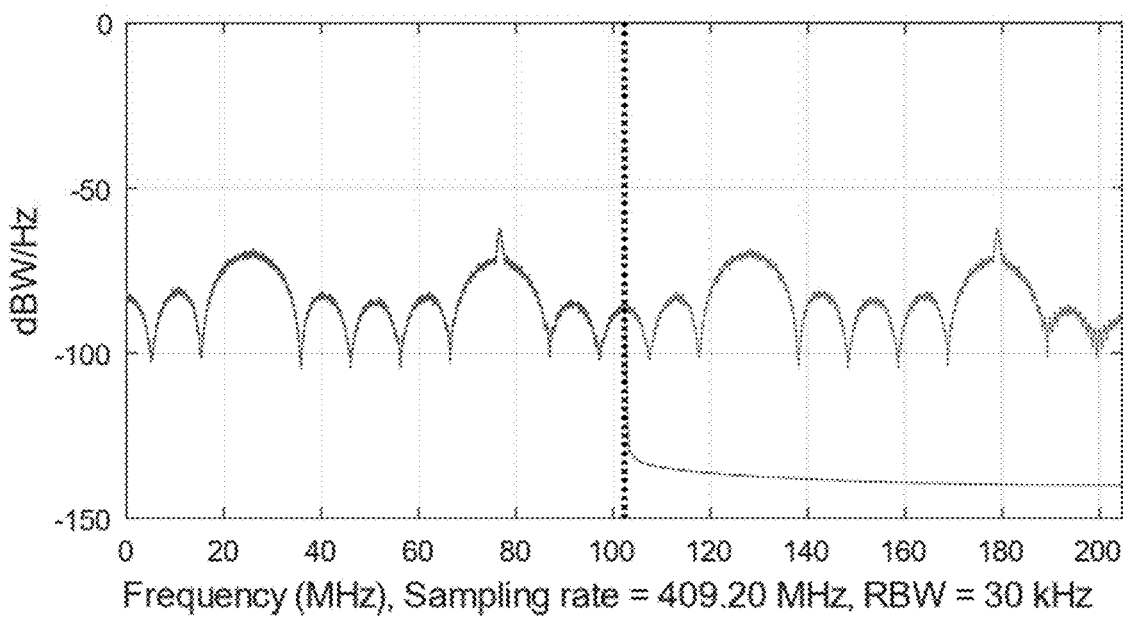
FIG. 14 illustrates filtered results with an approximated brick-wall low pass filter (LPF) according to one embodiments of the present disclosure.

FIG. 14 illustrates filtered results with an approximated brick-wall low pass filter (LPF) according to one embodiments of the present disclosure. To compute the filter CL, an approximate brick-wall LPF is implemented and the filtering results are shown in FIG. 14, where an infinite impulse response (IIR) LPF with a steepness of 0.99 is used to approximate the ideal brick-wall LPF.

Figure 15:
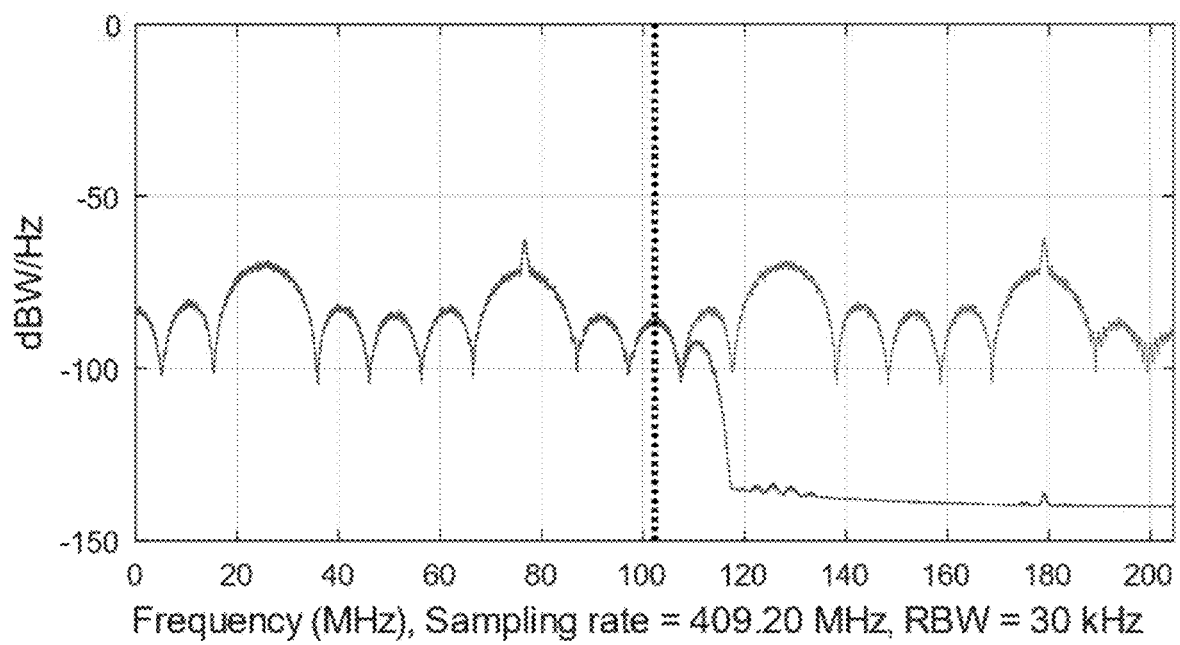
FIG. 15 illustrates filtered results with a practical LPF according to one embodiments of the present disclosure.

FIG. 15 illustrates filtered results with a practical LPF according to one embodiments of the present disclosure. The related filtering results with the practical LPF (used in the numerical simulation for CER and overall CL calculation) is shown in FIG. 15. The practical LPF is designed as a finite impulse response (FIR) LPF with a steepness of 0.85. Similarly, approximate brick-wall BPFs are implemented.

The filter CLs for L5I, L5Q, L2C, L2P are 0.0872 dB, 0.0840 dB, 0.0273 dB, and 0.0897 dB, respectively. The values are obtained much less the CL specified in GPS ICDs, where a 0.6 dB CL is for L5I, L5Q, L2P, and 0.3 dB CL for L2C.

Figure 16:
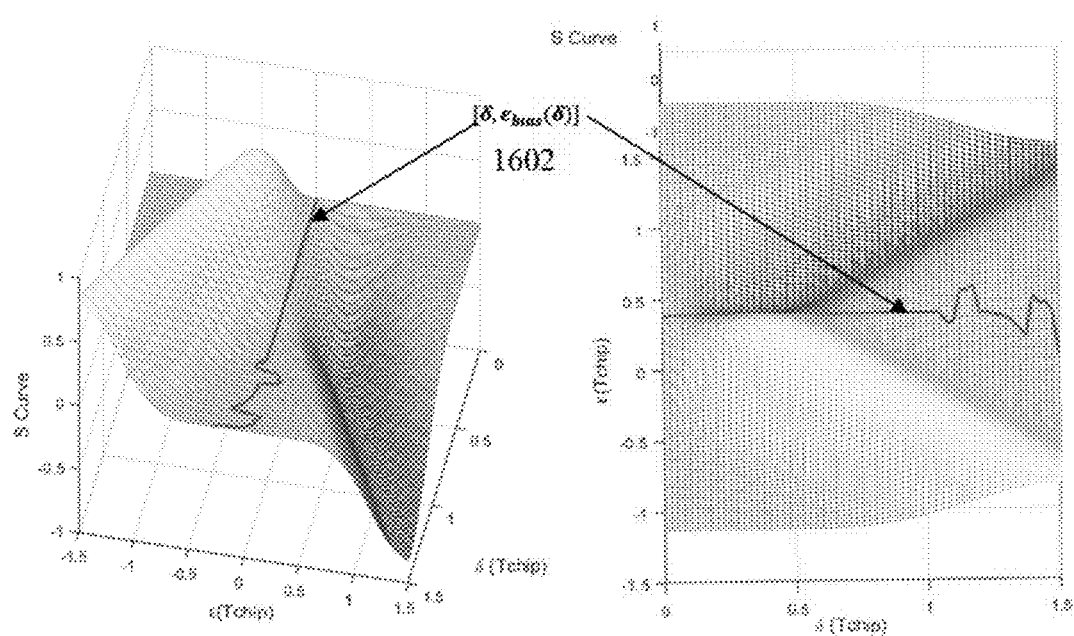
FIG. 16 illustrates a S-curve and lock points for L5I with MCEW according to one embodiments of the present disclosure.
Figure 17:
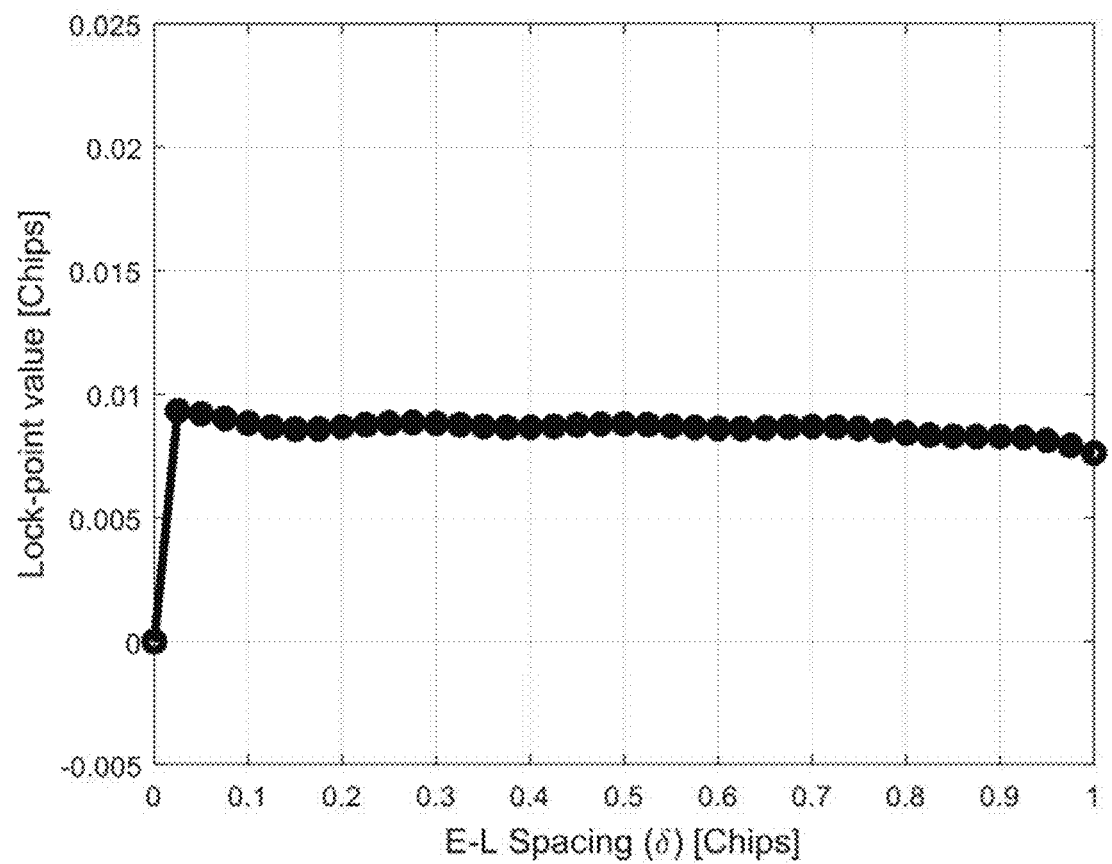
FIG. 17 illustrates S-curve lock points for L5I with MCEW according to one embodiments of the present disclosure.

FIG. 16 illustrates a S-curve and lock points for L5I with MCEW according to one embodiments of the present disclosure. To calculate the SCB, the S-curves as well as the lock points are plotted. The 3D plot of the S-curve for LI with the MCEW is shown in FIG. 16, where the lock points $[\delta, \varepsilon_{bias}(\delta)]$ are shown as the blue zero-crossing curve 1602. FIG. 17 illustrates S-curve lock points for LI with MCEW according to one embodiments of the present disclosure. The SCB is the jitter of the curve. The S-curve lock points for L5I is shown in FIG. 17.

Then the SCB for L5I can be calculated as $$SCB_{L5I} = \max_{over\ all\ \delta} \varepsilon_{bias}(\delta) - \min_{over\ all\ \delta} \varepsilon_{bias}(\delta) \quad (15)$$

$$= 0.0093\ TChip = 0.0093/10.23\ MHz = 0.9059\ ns$$

The SCB is compared with the published results (see Error! Reference source not found., pp. 178-179, SCB=0.9 ns for L5I). For other bitstreams, similar SCB results are also obtained. The numerical results (CER, CL, and SCB) demonstrate that the disclosed MCEW can be demodulated with the existing GNSS user equipment.

In this disclosure, novel multi-carrier constant envelope GNSS waveforms compatible with existing user equipment are disclosed. The GNSS channels of interest are combined using subcarriers. Then additional inter-modulation terms are employed to create the CE signals. The disclosed MCEW approach is generic to convert separate GNSS waveforms to a wideband multi-carrier CE modulation which can be demodulated using existing GNSS user equipment. A use case study on GPS L2 and L5 is conducted. The MCEW for this use case is simulated and successfully demodulated the MCEW using a standard GPS receiver. The numerical evaluation results of CER, CL, and SCB demonstrated the efficiency and backward compatibility of the disclosed MCEW.

Figure 18:
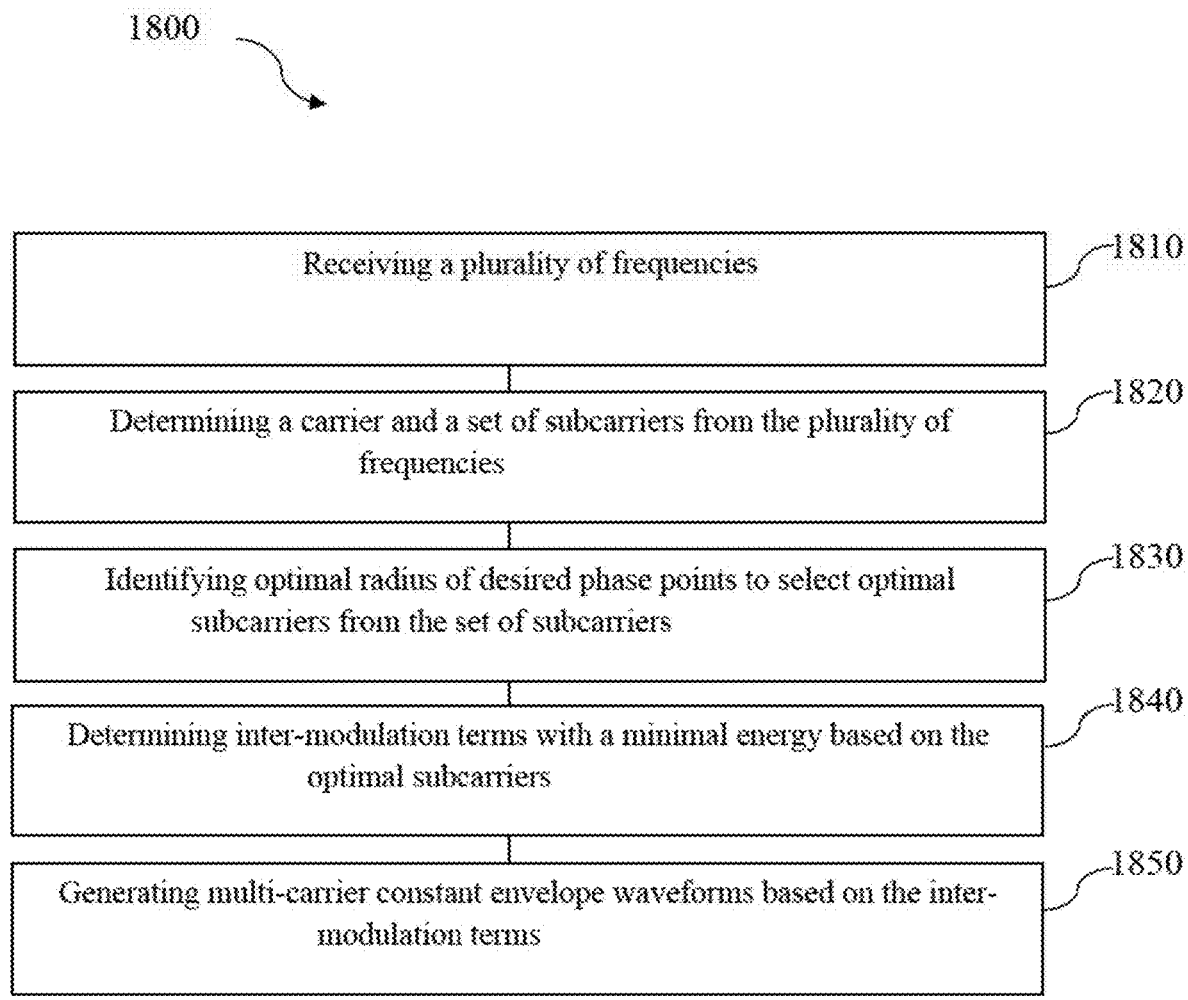
FIG. 18 illustrates a method of generating multi-carrier CE waveforms according to one embodiments of the present disclosure.

The present disclosure further provides a method. FIG. 18 illustrates a method 1800 of generating multi-carrier CE waveforms according to one embodiments of the present disclosure. The example method 1800 may be implemented in the example GNSS systems/processes/devices of generating multi-carrier CE waveforms. The example method 1800 may be performed/executed by a hardware processor of a computer system. The example method 1800 may include, but not limited to, the following steps. The following steps of the method 1800 may be performed sequentially, in parallel, independently, separately, in any order, or in any combination thereof. Further, in some embodiments, one or more of the following steps of the method 1800 may be omitted, and/or modified. In some embodiments, one or more additional steps may be added or included in the method 1800.

In step 1810, a plurality of frequencies is received. For example, the plurality of frequencies may be received by at least one transmitter of the example GNSS. In step 1820, a carrier and a set of subcarriers from the plurality of frequencies are determined. In step 1830, optimal radius of desired phase points is identified to select optimal subcarriers from the set of subcarriers. In step 1840, inter-modulation terms with a minimal energy are determined based on the optimal subcarriers. In step 1850, multi-carrier constant envelope waveforms are generated based on the inter-modulation terms. A minimum frequency is determined from the plurality of frequencies; a maximum frequency is determined from the plurality of frequencies; the carrier is determined from the minimum frequency and the maximum frequency; and the set of subcarriers is determined from the carrier and the plurality of frequencies. The carrier is an average of the minimum frequency and the maximum frequency. The set of subcarriers is determined by subtracting the carrier from each of the plurality of frequencies. The inter-modulation terms with the minimal energy are capable of ensuring a constant envelope property and keeping original phases. The multi-carrier constant envelope waveforms are capable of being demodulated using existing user equipment. The plurality of frequencies may include GPS L1, GPS L2 and/or GPS L5.

The present disclosure further provides a global navigation satellite system (GNSS) including a transmitter. The transmitter is configured to: receive a plurality of frequencies; determine a carrier and a set of subcarriers from the plurality of frequencies; identify optimal radius of desired phase points to select optimal subcarriers from the set of subcarriers; determine inter-modulation terms with a minimal energy based on the optimal subcarriers; and generate multi-carrier constant envelope waveforms based on the inter-modulation terms. The transmitter is further configured to: determine a minimum frequency from the plurality of frequencies; determine a maximum frequency from the plurality of frequencies; determine the carrier from the minimum frequency and the maximum frequency; and determine the set of subcarriers from the carrier and the plurality of frequencies. The carrier is an average of the minimum frequency and the maximum frequency. The set of subcarriers is determined by subtracting the carrier from each of the plurality of frequencies. The inter-modulation terms with the minimal energy are capable of ensuring a constant envelope property and keeping original phases. The multi-carrier constant envelope waveforms are capable of being demodulated using existing user equipment. The plurality of frequencies may include GPS L1, GPS L2 and/or GPS L5.

Figure 19:
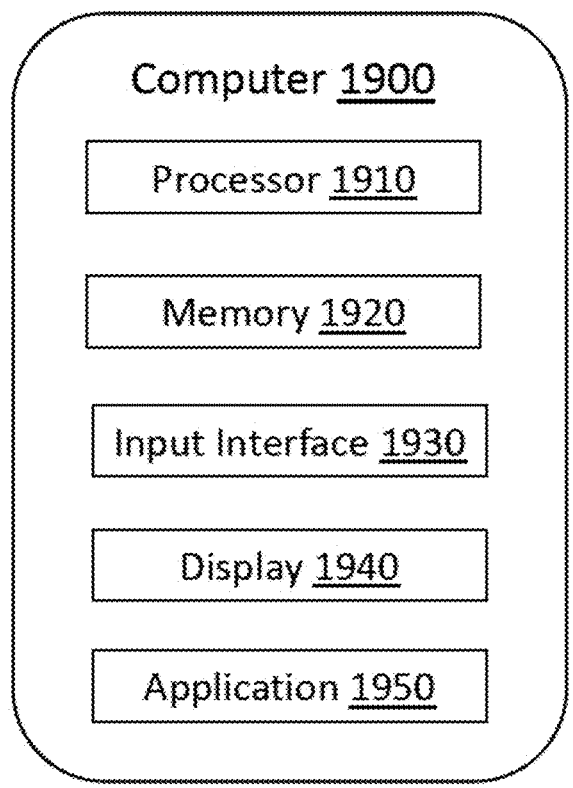
FIG. 19 illustrates an exemplary computer system according to one embodiments of the present disclosure.

FIG. 19 illustrates an example computer system 1900 according to the present disclosure. The computer system 1900 may be used in the GNSS systems disclosed herein for performing the methods/functions disclosed herein. The computer system 1900 may include, but not limited to, a desktop computer, a laptop computer, a notebook computer, a smart phone, a tablet computer, a mainframe computer, a server computer, a personal assistant computer, and/or any suitable network-enabled computing device or part thereof. For example, the computer system 1900 may be incorporated in the transmitter of the GNSS. The computer system 1900 may include a processor 1910, a memory 1920 coupled with the processor 1910, an input interface 1930, a display 1940 coupled to the processor 1910 and/or the memory 1920, and an application 1950.

The processor 1910 may include one or more central processing cores, processing circuitry, built-in memories, data and command encoders, additional microprocessors, and security hardware. The processor 1910 may be configured to execute computer program instructions (e.g., the application 1950) to perform various processes and methods disclosed herein.

The memory 1920 may include random access memory, read only memory, programmable read only memory, read/write memory, and flash memory. The memory 1920 may also include magnetic disks, optical disks, floppy disks, hard disks, and any suitable non-transitory computer readable storage medium. The memory 1920 may be configured to access and store data and information and computer program instructions, such as the application 1950, an operating system, a web browser application, and so forth.

The input interface 1930 may include graphic input interfaces and any device for entering information into the computer system 1900, such as keyboards, mouses, microphones, digital cameras, video recorders, and the like.

The display 1940 may include a computer monitor, a flat panel display, a liquid crystal display, a plasma panel, and any type of device for presenting information to users. For example, the display 1940 may include the interactive graphical user interface (GUI).

The application 1950 may include one or more applications including instructions executable by the processor 1910, such as the methods disclosed herein. The application 1950, when executed by the processor 1910, may enable network communications among components/layers of the systems disclosed herein. Upon execution by the processor 1910, the application 1950 may perform the steps and functions described in this disclosure.

The present disclosure further provides a non-transitory computer readable storage medium storing instructions that, when executed by one or more processors of one or more computer devices, cause the one or more processors to perform a method implemented in a global navigation satellite system (GNSS) including a transmitter. The method includes: receiving a plurality of frequencies; determining a carrier and a set of subcarriers from the plurality of frequencies; identifying optimal radius of desired phase points to select optimal subcarriers from the set of subcarriers; determining inter-modulation terms with a minimal energy based on the optimal subcarriers; and generating multi-carrier constant envelope waveforms based on the inter-modulation terms. The method further includes: determining a minimum frequency from the plurality of frequencies; determining a maximum frequency from the plurality of frequencies; determining the carrier from the minimum frequency and the maximum frequency; and determining the set of subcarriers from the carrier and the plurality of frequencies. The carrier is an average of the minimum frequency and the maximum frequency. The set of subcarriers is determined by subtracting the carrier from each of the plurality of frequencies. The inter-modulation terms with the minimal energy are capable of ensuring a constant envelope property and keeping original phases. The plurality of frequencies include GPS L1, GPS L2 and/or GPS L5.

While the disclosure has been illustrated with respect to one or more implementations, alterations and/or modifications can be made to the illustrated examples without departing from the spirit and scope of the appended claims. In addition, while a particular feature of the disclosure may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A global navigation satellite system (GNSS) comprising a transmitter, the transmitter configured to:
   receive a plurality of frequencies;
   determine a minimum frequency from the plurality of frequencies;
   determine a maximum frequency from the plurality of frequencies;
   determine a carrier from the minimum frequency and the maximum frequency;
   determine a set of subcarriers from the carrier and the plurality of frequencies;
   identify optimal radius of desired phase points to select optimal subcarriers from the set of subcarriers;
   determine inter-modulation terms with a minimal energy based on the optimal subcarriers; and
   generate multi-carrier constant envelope waveforms based on the inter-modulation terms.

2. The GNSS of claim 1, wherein the carrier is an average of the minimum frequency and the maximum frequency.

3. The GNSS of claim 1, wherein the set of subcarriers is determined by subtracting the carrier from each of the plurality of frequencies.

4. The GNSS of claim 1, wherein the inter-modulation terms with the minimal energy are capable of ensuring a constant envelope property and keeping original phases.

5. The GNSS of claim 1, wherein the multi-carrier constant envelope waveforms are capable of being demodulated using existing user equipment.

6. The GNSS of claim 1, wherein the plurality of frequencies include GPS L1, GPS L2 and/or GPS L5.

7. A method implemented in a global navigation satellite system (GNSS) comprising a transmitter, the method comprising:
   receiving a plurality of frequencies;
   determining a minimum frequency from the plurality of frequencies;
   determining a maximum frequency from the plurality of frequencies;
   determining a carrier from the minimum frequency and the maximum frequency;
   determining a set of subcarriers from the carrier and the plurality of frequencies;

identifying optimal radius of desired phase points to select optimal subcarriers from the set of subcarriers;
determining inter-modulation terms with a minimal energy based on the optimal subcarriers; and
generating multi-carrier constant envelope waveforms based on the inter-modulation terms.

8. The method of claim 7, wherein the carrier is an average of the minimum frequency and the maximum frequency.

9. The method of claim 7, wherein the set of subcarriers is determined by subtracting the carrier from each of the plurality of frequencies.

10. The method of claim 7, wherein the inter-modulation terms with the minimal energy are capable of ensuring a constant envelope property and keeping original phases.

11. The method of claim 7, wherein the multi-carrier constant envelope waveforms are capable of being demodulated using existing user equipment.

12. The method of claim 7, wherein the plurality of frequencies include GPS L1, GPS L2 and/or GPS L5.

13. A non-transitory computer readable medium having instructions stored thereon that, when executed by a computer device, cause the computer device to perform a method implemented in a global navigation satellite system (GNSS) comprising a transmitter, the method comprising:
receiving a plurality of frequencies;
determining a minimum frequency from the plurality of frequencies;
determining a maximum frequency from the plurality of frequencies;
determining a carrier from the minimum frequency and the maximum frequency;
determining a set of subcarriers from the carrier and the plurality of frequencies
identifying optimal radius of desired phase points to select optimal subcarriers from the set of subcarriers;
determining inter-modulation terms with a minimal energy based on the optimal subcarriers; and
generating multi-carrier constant envelope waveforms based on the inter-modulation terms.

14. The non-transitory computer readable medium of claim 13, wherein the carrier is an average of the minimum frequency and the maximum frequency.

15. The non-transitory computer readable medium of claim 13, wherein the set of subcarriers is determined by subtracting the carrier from each of the plurality of frequencies.

16. The non-transitory computer readable medium of claim 13, wherein the inter-modulation terms with the minimal energy are capable of ensuring a constant envelope property and keeping original phases.

17. The non-transitory computer readable medium of claim 13, wherein the plurality of frequencies include GPS L1, GPS L2 and/or GPS L5.

18. The non-transitory computer readable medium of claim 13, wherein the multi-carrier constant envelope waveforms are capable of being demodulated using existing user equipment.

* * * * *